United States Patent [19]

Zagdoun et al.

[11] Patent Number: 5,348,805
[45] Date of Patent: Sep. 20, 1994

[54] FORMATION OF A LAYER OF ALUMINUM AND TIN OR TITANIUM OXIDES ON A GLASS SUBSTRATE

[75] Inventors: Georges Zagdoun, La Garenne Colombes; Bruno Cordier, Nanteuil les Meaux, both of France

[73] Assignee: Saint-Gobain Vitrage International, Courbevoie, France

[21] Appl. No.: 14,100

[22] Filed: Feb. 5, 1993

Related U.S. Application Data

[63] Continuation-in-part of Ser. No. 724,048, Jul. 1, 1991, abandoned.

[30] Foreign Application Priority Data

Jul. 5, 1990 [FR] France ............................ 90 08530
Jul. 5, 1990 [FR] France ............................ 90 08531

[51] Int. Cl.$^5$ ............................................. B32B 15/04
[52] U.S. Cl. ..................................... 428/432; 428/209;
428/210; 428/212; 428/216; 428/425.6;
428/437; 428/442; 428/697; 428/699; 428/701;
428/702; 359/359; 359/580; 359/586
[58] Field of Search ................... 359/359, 580, 586;
428/432, 436, 699, 697, 701, 702, 210, 216, 212,
437, 442, 209, 425.6

[56] References Cited

U.S. PATENT DOCUMENTS

| | | | |
|---|---|---|---|
| 2,833,902 | 5/1958 | Gaiser et al. | 201/73 |
| 3,833,399 | 9/1974 | Martin et al. | 117/33.5 L |
| 3,926,658 | 12/1975 | Cole et al. | 106/287 |
| 4,160,061 | 7/1979 | Okino et al. | 428/334 |
| 4,308,316 | 12/1981 | Gordon | 359/359 |
| 4,500,567 | 2/1985 | Kato et al. | 427/255 |
| 4,528,234 | 7/1985 | Kaiho et al. | 428/216 |
| 4,547,400 | 10/1985 | Middleton et al. | 427/160 |
| 4,556,599 | 12/1985 | Sato et al. | 428/432 |
| 4,707,383 | 11/1987 | Mattes et al. | 427/168 |
| 4,725,109 | 2/1988 | Wank et al. | 359/359 |
| 4,854,670 | 8/1989 | Mellor | 359/359 |
| 4,865,405 | 9/1989 | Kageyama | 359/359 |
| 4,896,928 | 1/1990 | Perilloux et al. | 359/359 |
| 5,061,568 | 10/1991 | Kessel et al. | 428/437 |

FOREIGN PATENT DOCUMENTS

| | | |
|---|---|---|
| 85/05292 | 12/1985 | PCT Int'l Appl. . |
| 640206 | 12/1983 | Switzerland . |
| 1510487 | 5/1978 | United Kingdom . |
| 2139997 | 11/1984 | United Kingdom . |
| 2163140 | 2/1986 | United Kingdom . |

OTHER PUBLICATIONS

Laidler et al., "Physical Chemistry", 1982, Benjamin Cummings Pub., p. 893.

*Primary Examiner*—Ellis P. Robinson
*Assistant Examiner*—Timothy M. Speer
*Attorney, Agent, or Firm*—Pennie & Edmonds

[57] ABSTRACT

A solution of an organic compound of aluminum and tin or titanium is formed from, respectively, a nonhydrolyzable aluminum chelate and at least one organic compound of tin or a titanium chelate or alcoholate. The solution is then sprayed onto a heated glass substrate, thereby thermally decomposing and oxidizing the solution on the heated glass substrate to form, respectively, a layer of aluminum and tin or titanium oxides on the glass substrate. A semiconductive layer can be deposited upon the aluminum/tin or aluminum/titanium layer to form a coated glass structure which is useful for buildings or automobiles.

14 Claims, No Drawings

FORMATION OF A LAYER OF ALUMINUM AND TIN OR TITANIUM OXIDES ON A GLASS SUBSTRATE

This is a continuation-in-part of application Ser. No. 07/724,048, filed Jul. 1, 1991, now abandoned.

BACKGROUND OF THE INVENTION

1. Field of the Invention

This invention relates to a process for forming a layer of aluminum and tin oxides or aluminum and titanium oxides on a glass substrate. This invention further relates to a glass substrate carrying this layer as well as the use of this layer with a thin, semiconductive, transparent metal oxide layer for use in buildings or in motor vehicles.

2. Description of the Prior Art

Glazings intended for use in buildings usually comprise clear soda-lime-silica glass which exhibits high light and energy transmission factors. For example, soda-lime-silica glass which is 4 mm thick will absorb only about 10% of the light and energy to which it is exposed. To improve the comfort of the building's occupants, particularly in the winter, it is known to cover a face of a glass sheet with a transparent, semiconductive, low emissivity metal oxide layer to increase the rate of infrared reflection of the glazing. Such a layer will reduce the energy loss of the building due to the escape of heat from the inside of the building to the outside through the glazing.

Glazings which carry transparent coatings and exhibit properties of low emissivity are known in the prior art. Some of these glazings comprise, for example, a glass substrate and a thin metal oxide layer of tin oxide doped with fluorine, or a layer of indium oxide doped with tin (ITO). These semiconductive layers may be obtained by various processes, which include the vacuum processes of thermal evaporation or cathode sputtering. Alternatively, these semiconductive layers may be obtained by pyrolysis of metal compounds in the form of a powder or vapor solution sprayed on a heated substrate. The heat of the substrate causes the compounds to decompose and oxidize to form a semiconductive metal oxide layer. These layers exhibit properties satisfactory for use in low-emissivity glazings in buildings.

These semiconductive layers also have optical and electrical properties that make them suitable for use as heated windows and windshields in motor vehicles. Further, these layers may be used in photoelectronic devices such as photovoltaic cells and display devices with liquid crystals.

However, semiconductive layers appear colored in reflection at the thicknesses necessary for obtaining advantageous electronic properties. For example, layers of tin oxide doped with fluorine and ITO layers which are 180 nm thick appear to be blue in reflection, and layers having thicknesses of 360 nm appear to be green in reflection. These reflected colors are often undesirable for a particular application of a glazing. Further, slight variations of thicknesses in the semiconductive layers cause undesirable color irregularities or iridescence.

To eliminate or reduce this color irregularity or iridescence, it has been proposed to deposit on the glass substrate, before forming the semiconductive layer, a so-called intermediate layer or sublayer. The thickness and index of refraction of this intermediate layer is such that the combination of the intermediate and semiconductive layers forms a coating structure that displays a neutral color in reflection.

Intermediate layers that exhibit an index of refraction suitable for forming such a coating structure are, for example, formed from metal oxides, metal nitrides or combinations thereof. These intermediate layers may comprise, for example, aluminum oxide, silicon oxycarbide or silicon oxynitride, or aluminum oxide combined with other oxides such as $SnO_2$, $ZnO$, $In_2O_3$, $TiO_2$, etc.

These intermediate layers, with their specific thicknesses and indices of refraction, make it possible to eliminate or significantly reduce the color observed in reflection of the semiconductive layer. However, although iridescence of the semiconductive layer is somewhat reduced, iridescence can still be observed as approximately parallel bands which resemble colored undulations. Although the bands are not as readily noticeable as the bands in a glazing that does comprise an intermediate layer between the glass substrate and the semiconductive layer, these undulations are unacceptable for a product of high quality.

SUMMARY OF THE INVENTION

Accordingly, it is an object of the present invention is to form an intermediate layer which exhibits good adherence to the glass substrate, in particular, an intermediate layer comprising $Al_2O_3$—$SnO_2$ or $Al_2O_3$—$TiO_2$.

It is a further object of the present invention to form a transparent, thin film on a glass substrate, wherein the thin film is suitable for use as an intermediate layer between the substrate and a semiconductive, transparent metal oxide layer to form a glazing which exhibits a neutral color in reflection and which displays substantially no iridescence or undulations.

A still further object of the present invention is to produce a glazing comprising a glass substrate covered with a thin, transparent layer of aluminum and tin oxides or aluminum and titanium oxides, and further covered with a semiconductive, transparent metal oxide layer, wherein the glazing exhibits transparency and electrical conductivity characteristics suitable for use as heated glazings, low-emissivity glazings, liquid crystal display devices and photoelectronic devices such as photovoltaic cells.

In accordance with the present invention, there is provided a process for forming a layer of mixed metal oxide on a glass substrate which comprises heating a glass substrate to a temperature less than its softening temperature, and forming a solution of a nonhydrolyzable aluminum chelate and at least one second metal compound other than aluminum. Preferably, the second metal is tin or titanium. The solution is then sprayed onto the heated glass substrate, thereby thermally decomposing and oxidizing the solution on the heated glass substrate to form a layer of aluminum and second metal oxides on the glass substrate.

DETAILED DESCRIPTION OF THE PREFERRED EMBODIMENTS

Intermediate layers of aluminum and tin oxides ($Al_2O_3$—$SnO_2$) or aluminum and titanium oxides ($Al_2O_3$—$TiO_2$) according to the present invention are formed by a liquid-phase pyrolysis process. Liquid pyrolysis processes and devices for their use are described, for example, in French patents 2,176,760; 2,211,411, and in European patents 12,679; 25,738; 60,747 and 51,538.

First, a glass substrate is formed, for example, in a "float" furnace and maintained at a high temperature. This high temperature, which is less than the temperature at which the glass substrate exits the float furnace, is the temperature of the glass substrate at which the pyrolysis process is performed. The glass substrate can be formed from a soda-lime-silica glass conventionally used for motor vehicle glazings and for buildings. The glass substrate has a softening temperature at which the substrate will become soft, and the high temperature at which the glass substrate is maintained is less than the softening temperature. Although the high temperature depends on the composition of the glass substrate, it is generally between 500° C. and 750° C. In the preferred embodiment of the present invention, the high temperature is between 600° C. and 650° C.

The glass substrate is then passed into a station for spraying a solution of thermally decomposable metal compounds onto the heated glass substrate. The station essentially comprises one or more moveable spray guns which are loaded with the solution and are charged with air or nitrogen gas. The spray guns are moveable both fore and aft and crosswise along the heated glass substrate.

The solution comprises a nonhydrolyzable aluminum chelate and (1) at least one tin compound or (2) a titanium chelate or alcoholate.

The aluminum chelate chosen for the preferred embodiment of the present invention should be nonhydrolyzable aluminum acetylacetonate or aluminum isovalerylacetonate. The aluminum chelate should be nonhydrolyzable because a hydrolyzable chelate is transformed to aluminum hydrate, which precipitates and is no longer pyrolyzable.

Tin compounds suitable for use with the preferred embodiment of the present invention are organic compounds containing oxygen. In particular, these organic compounds do not contain a halogen. The presence of chloride, for example, can cause the formation of sodium chloride as a result of a reaction with sodium ions of the glass substrate. Sodium chloride can modify the optical characteristics of the glass substrate. Usable tin compounds are, for example, dibutyltin oxide (DBTO) and dibutyltin acetate (DBTA). The aluminum compound and tin compound are present in the solution in a preselected concentration. The concentration is expressed as a ratio of the weight of the metals (Al/Sn), and is preferably between 0.10:1 and 0.70:1.

The solution of organometallic compounds which is useful for forming an $Al_2O_3$—$TiO_2$ layer comprises aluminum chelate and a titanium chelate or alcoholate. The titanium chelate is a titanium acetylacetonate and titanium Isopropoxide $(acac)_2Ti(OiPR)_2$, available from Huls Troisdorf Ag Company, while the titanium alcoholate is preferably titanium tetraoctyleneglycol, available from the Huls Troisdorf Ag Company under product code OGT-HU, or titanium triethanolamine, available from the Huls Troisdorf Ag Company. The aluminum and titanium compounds are also present in the solution in a preselected concentration, which may be expressed as a ratio of the weights of the metals (Al/Ti).

The solutions of aluminum and tin or titanium compounds are generally prepared by first separately dissolving the compounds into their respective solvents to form an aluminum chelate solution. Any solvent of aluminum and, preferably, a solvent common to aluminum, tin and titanium, for example ethyl acetate, may be used. Generally, the aluminum chelate concentration in the solution should have a viscosity suitable for use in spraying devices which are typically used with the pyrolysis process. The aluminum chelate is dissolved in the solvent preferably to obtain a concentration of 1 to 3 g of metallic aluminum per 100 ml of solution.

Dibutyltin oxide (DBTO) can be dissolved preferably in an alcohol such as ethanol or 1-propanol to form an intermediate solution. These DBTO solvents do not significantly influence the pyrolysis output of the spray solutions. DBTO has a concentration in this intermediate solution of 300 g to 800 g per liter of alcohol, and preferably, approximately 700 g per liter.

Dibutyltin diacetate (DBTA) has solvents which are, for example, lower alcohols such as ethanol or propanol and esters such as ethyl acetate. Pure DBTA is preferably used.

Any solvent of the titanium compounds can be used to form an intermediate solution. Preferably, ethyl acetate, which is also a solvent for aluminum chelate, is used. The intermediate solution of these titanium compounds, as mentioned hereinabove with respect to the solution of aluminum chelate, has a viscosity suitable for use in spraying devices typically used with the pyrolysis process.

The titanium compounds are present in the intermediate solution at a preselected concentration, expressed as a ratio of the weight of titanium to aluminum, of preferably about 2:1. For different ratios, poorer chemical resistance and nonhomogeneity of the intermediate layer will result.

The solution is then loaded into the spray guns for application onto the glass substrate. By monitoring of the flow of the solution into these spray guns, the speed of travel of the glass substrate through the station, and the crosswise movement of the guns, intermediate layers of preselected thicknesses may be formed on the glass substrate.

Further, by monitoring the concentrations of the aluminum and tin or titanium compounds in the spray solution, the intermediate layer can be provided with an index of refraction that is tailored to the application considered for the layer, i.e., a reflective layer, an anticolor layer, etc. . . For example, solutions having an Al/Ti ratio of less than about 2:1 will form intermediate layers having an index of refraction between 1.73 and 1.80.

An Al/Sn ratio in the layer of between 1.15 and 1.40 will form intermediate layers having an index of refraction between 1.65 and 1.76. Further, spray solutions containing 13% to 30% by volume of dibutyltin diacetate (DBTA) or containing 30% to 50% by volume of dibutyltin oxide (DBTO) can be used to form intermediate layers that exhibit an index of refraction within that range.

If concentrations of compounds are taken outside the above-mention ranges, intermediate layers having desirable properties for use in glazings will not be obtained. For example, concentrations of compounds less than the Al/Sn lower limit will form intermediate layers which have indices of refraction which are too low. For amounts of solution containing greater than 30% of DBTA, a heterogeneous layer will be obtained because the solution is too viscous. For amounts of DBTO greater than 50% by volume, an intermediate layer with good homogeneity will be obtained, but the layer will exhibit too high an index of refraction.

Therefore, the presence of the aluminum chelate and nonhalogenated tin compounds comprising oxygen or the presence of the aluminum chelate and titanium chelate or titanium alcoholate make it possible to obtain by liquid pyrolysis an intermediate layer on the glass substrate which adheres well to the substrate, which is homogeneous and which has a highly uniform thickness. According to the preferred embodiment of this invention, the intermediate layer has a thickness between 40 nm and 150 nm with a thickness variation $\Delta e/e$ less than or equal to 5%. The intermediate layer of aluminum and tin oxides further has an absorption coefficient which is less than or equal to 3%.

Intermediate layers of $Al_2O_3$—$SnO_2$ or $Al_2O_3$—$TiO_2$ are particularly useful in products comprising a glass substrate and a thin, semiconductive, transparent metal oxide layer for forming heated or low-emissivity transparent glazings. These glazings have a neutral color in reflection and do not exhibit colored iridescence or undulations.

However, caution must be exercised in spraying the solution onto the glass substrate. If too large an amount of solution is sprayed on the glass substrate, the temperature of the heated substrate will decrease. If the heated substrate is cooled too much, the organometallic compounds will not decompose satisfactorily. Such unsatisfactory decomposition will lead to intermediate layers that have mediocre properties.

The glass substrate is preferably a soda-lime-silica glass conventionally used for motor vehicle glazings and for buildings. Soda-lime-silica, because it is a clear glass, is uncolored and exhibits significant light transmission factors. For example, soda-lime-silica glass transits greater than 90% of light when the glass is less than 4 mm thick.

Soda-lime-silica glass may also be a completely colored glass. Since colored glass transmits a very small amount of energy, such glass is particularly well-suited for increased summer comfort for occupants of a building or for passengers of a vehicle equipped with such glass. Generally, for use in glazings for motor vehicles, the glass substrate must satisfy certain regulations; i.e., the glass, semiconductive layer and intermediate layer must transmit at least 70% to 75% of light to which it is exposed. The light transmission ($T_L$) requirements depend on applicable laws.

It is possible to use a glass called "TSA" which is similar to colored glass as a glass substrate. TSA glass contains $Fe_2O_3$ in proportions by weight of approximately 0.55% to 0.62%, and FeO in proportions of approximately 0.11 to 0.16%. These proportions lead to an $Fe^{2+}/Fe$ ratio of 0.19:1 to 0.25:1. CoO is present for less than 12 ppm and, preferably for less than 10 ppm.

TSA glass which is, for example, 3.85 mm thick has a high light transmission ($T_L$) valve of 78% (illuminant $D_{65}$), and a relatively low energy transmission factor ($T_E$) of 60%. These valves lead to a $T_L/T_E$ ratio of 1.30:1.

When applicable regulations call for a light transmission of only 70%, it is possible to use a slightly greater colored glass which is called "$TSA^{2+}$" glass. This $TSA^{2+}$ glass is colored by the same oxides as TSA glass but in slightly different proportions. $TSA^{2+}$ glass contains $Fe_2O_3$ in proportions by weight of approximately 0.75% to 0.90% and FeO in proportions of approximately 0.15% to 0.22%. These proportions lead to a $Fe^{2+}/Fe$ ratio of 0.20:1. CoO is present for less than 17 ppm and preferably less than 10 ppm.

$TSA^{2+}$ glass which has a thickness of 3.85 mm, for example, has a light transmission factor of 72% and an energy transmission factor of 50%. These values lead to a $T_L/T_E$ ratio of 1.4:1 to 1.5:1.

The thin intermediate layers of $Al_2O_3$—$SnO_2$ or $Al_2O_3$—$TiO_2$ can also be advantageously formed while the glass substrate is being produced. In the case of "float" glass, the glass substrate is displaced at advancing speeds which vary between 3 and 25 m/min. Processes and devices have already been developed that make it possible to form the semiconductive metal oxide layer on the glass substrate while it is displaced at such speeds. An intermediate layer should therefore also be able to be formed with the semiconductive layer on the production line of the substrate to form a glazing which has a neutral color in reflection and which displays no iridescence. Factors to be considered in producing this intermediate layer are the advancing speed of the glass substrate, the temperature of the substrate, and the devices usually used for the formation of semiconductive metal oxide layers.

The intermediate layers of $Al_2O_3$—$SnO_2$ or $Al_2O_3$—$TiO_2$, which are transparent and are very uniform in thickness, are also useful in antiglare glazings. An antiglare glazing is obtained by first forming, on a glass substrate with an index of refraction equal to 1.52, one of two types of intermediate glazing layers. A first type of layer is an $Al_2O_3$—$SnO_2$ layer formed from a solution containing DBTO and whose Al/Sn ratio is 0.17:1. This solution leads to a layer with an index of refraction of 1.74 and a thickness of 60–70 nm. A second type of intermediate glazing layer is an $Al_2O_3$—$TiO_2$ layer formed from a solution containing aluminum and a titanium chelate or alcoholate and whose Al/Ti ratio is 1.55:1. This solution leads to a layer with an index of refraction of $1.74\pm0.01$ and a thickness of 60–70 nm. Both intermediate glazing layers have an optical thickness equal to $\lambda/4$.

On either intermediate glazing layer, a $TiO_2$ layer is then formed by liquid pyrolysis, so that the $TiO_2$ layer has an optical thickness equal to $\lambda/2$. An $SiO_2$ layer is then formed on the $TiO_2$ layer, for example, by CVD plasma deposition, and the $SiO_2$ layer has an optical thickness equal to $\lambda/4$.

Such an antiglare glazing has a light reflection coefficient which is less than 1% per treated glazing face. The intermediate glazing layer of $Al_2O_3$—$SnO_2$ or $Al_2O_3$—$TiO_2$, as a result of their uniform thickness, provides a reflection coefficient which is very homogeneous over the entire product.

The layers of $Al_2O_3$—$SnO_2$ and $Al_2O_3$—$TiO_2$ obtained according to the present invention further constitute layers which act as a barrier to diffusion of alkaline ions. Glazings carrying the layers can therefore be useful as substrates in photoelectronic devices such as liquid crystal display devices, in which the diffusion of alkaline ions, particularly sodium, is undesirable.

Various semiconductive layers can be deposited on the $Al_2O_3$—$SnO_2$ layer formed by the present invention. The semiconductive layers can be in particular layers of tin oxide doped with fluorine ($SnO_2$:F) or layers of indium oxide doped with tin (ITO), or layers of zinc oxide doped with indium or aluminum, as indicated hereinabove.

The semiconductive layers of $SnO_2$:F and ITO are preferably obtained by pyrolysis of powders. Thus, layers of tin oxide doped with fluorine can be produced from powdered dibutyltin oxide (DBTO) and gaseous, anhydrous hydrofluoric acid, as described in French patent 2,380,997. Tin oxide doped with fluoride may also be produced from dibutyltin difluoride (DBTF) in mixture with DBTO as described in EP-A 178,956 or EP-A-039,256. ITO layers may be obtained from indium formate and a tin compound such as DBTO as described in EP-A-192,009.

It is also possible to obtain semiconductive $SnO_2$:F layers by gas phase pyrolysis. Particularly, $SnO_2$:F layers may be formed from a mixture of tin compounds such as $(CH_3)_2SnCl_2$, $(C_4H_9)_2SnCl_2$, or $Sn(C_2H_5)_4$ and organofluorine compounds such as $CCl_2F_2$, $CHClF_2$ and $CH_3CHF_2$, as described in EP-A-027,403. Alternatively, $SnO_2$:F layers may be formed from monobutyl tin trichloride and a compound of formula $XCHF_2$ such as chlorodifluoromethane, as described in EP-A-121,459.

These semiconductive layers of zinc oxide doped with indium or with aluminum can be obtained by vapor phase pyrolysis from diethyl zinc or zinc acetate and triethyl indium, indium chloride or triethyl aluminum or aluminum chloride, as described in EP-A-385,769.

The $SnO_2$:F semiconductive layers can also be obtained in liquid phase from tin acetylacetonate or from dimethyltin-2-propionate in suitable organic solvents, as described particularly in French patent 2,211,411.

Intermediate layers of $Al_2O_3$—$SnO_2$ or $Al_2O_3$—$TiO_2$ with thicknesses between 80 nm and 100 nm, combined with a semiconductive metal oxide layer of interferential thickness (100 to 800 nm) provide a coating structure that has neutral color in reflection and that does not exhibit iridescence or undulations. Such a structure is useful for forming heated glazings for use in motor vehicles, particularly windshields, or low-emissivity glazings. In particular, when the semiconductive layer of the low-emissivity glazing comprises an $SnO_2$:F layer, the glazing exhibits an emissivity of less than or equal to 0.27. Further, when the semiconductive layer has a thickness greater than or equal to 300 nm, the glazing exhibits an emissivity of less than or equal to 0.25.

The neutral color in reflection of the coating structure depends, as hereinabove described, on the index of refraction and the thickness of the intermediate layer. This neutral color is defined by a dominant wavelength ($\lambda$ dom) in reflection and by the purity of the dominant wavelength. The dominant wavelength, measured by spectrophotometry, is determined as a function of an illuminant; illuminant $D_{65}$ is usually used for buildings and illuminant A is usually used for motor vehicles.

In the present invention, the purity of the coating structure must be as low as possible in order to obtain optical neutrality in reflection. Coating structures should exhibit a purity of less than 10%, irrespective of the illuminant chosen, to achieve the objects of the present invention.

The chemical resistance of glazings comprising glass substrates carrying an intermediate layer of $Al_2O_3$—$SnO_2$ or $Al_2O_3$—$TiO_2$ and a semiconductive layer of $SnO_2$:F was determined by submerging samples of the glazings in a normal hydrochloric acid solution at 100° C. and, also, in a hydrofluoric acid solution at 20° C. The hydrofluoric acid solution was formed by 7 ml of a 40% solution of HF diluted in one liter of water.

Glazings submerged in these acids did not demonstrate any reaction for over 30 minutes. Thus, these products have excellent resistance to chemicals.

The glazings obtained according to the present invention can be combined with a sheet of a plastic polymer, such as polyurethane, which is placed in contact with the semiconductive layer to form a laminated glazing. These glazings can also be combined with another glass plate by a sheet of a plastic polymer, such as polyvinylbutyral, polyurethane or polyvinylchloride, to form a laminated glazing with two glass plates.

To supply electric current to the semiconductive layer, these glazings may further comprise power lead-ins, such as copper foils and/or silk-screened silver strips, placed along the upper and lower edges of the glazings. Black enamel is generally deposited on these glazings to hide these power lead-ins, and this enamel is not damaged by the intermediate layer.

The glazings according to the present invention can also undergo further processing steps i.e., bending, without drawbacks, because the intermediate layers and the semiconductive layers are mechanically resilient.

The following nonlimiting examples are illustrative of the present invention. Examples 1 to 3 relate to obtaining $Al_2O_3$—$SnO_2$ layers from DBTO. Examples 4 to 6 relate to $Al_2O_3$—$SnO_2$ layers obtained from DBTA. Examples 7 to 13 describe the formation of a semiconductive layer on the $Al_2O_3$—$SnO_2$ layer obtained according to Examples 2 to 6. Examples 14 to 19 are similar to Examples 7 to 13, but relate to $Al_2O_3$—$TiO_2$ layers.

EXAMPLE 1

Solution A, comprising 700 g of DBTO at 50°-60° C., is prepared by dissolving the DBTO with stirring in 1,000 ml of ethanol and 200 g of ammonium acetate at 95° GL. Ammonium acetate is used to obtain maximum dissolution of the DBTO. 1.71 of solution A, which is a solution of 19.6 g of Sn per 100 ml, is obtained.

A solution B of nonhydrolyzable aluminum chelate (aluminum isovalerylacetonate) is mixed with ethyl acetate to form a solution having a concentration of 2.6 g of aluminum per 100 ml.

Solutions A and B are mixed quickly at a proportion of 30 ml of solution A to 70 ml of solution B. These solutions are totally miscible and form a solution C. Solution C has a concentration of aluminum and tin compounds, expressed as a weight ratio of the metals (Al/Sn), of 0.31:1.

Solution C is used in a spray device, such as that described in French patent 2,176,760. This spray device is positioned at the exit of a float furnace through which the glass substrate passes. The substrate is 6 mm thick, 3.4 mm wide, and is preferably at a temperature of about 600° C. The glass substrate preferably advances at a speed of 6 m/min.

Air at a delivery rate of 34 m³/h is used as an atomizing gas. Solution C is sprayed onto the glass substrate at a rate of 33 l/h from the spray device, while the spray device is also displaced at a speed of 2.4 m/s crosswise to the direction of advance of the glass substrate.

Solution C will thus form an $Al_2O_3$—$SnO_2$ layer on the glass substrate. This layer has a concentration of aluminum and tin compounds, expressed as a weight ratio of the metals (Al/Sn), of 1.36:1.

The glass substrate carrying the $Al_2O_3$—$SnO_2$ layer, then passes into an annealing furnace. After the glass product cools, it is cut to the desired size or shape.

The $Al_2O_3$—$SnO_2$ layer has a thickness and index of refraction that are then measured by ellipsometry. The thickness is 90 nm with a thickness variation of Δe/e of 5%. The index of refraction of the layer is 1.80±0.01.

The layer and glass substrate are then heated to a temperature of 650° C. to simulate the heating conditions to which the layer and substrate will be subjected for subsequent deposition of the semiconductive layer. The index of refraction, after heating, is 1.66±0.01. This layer is now stable, and the index of refraction will not vary after further heating. The thickness of the layer also does not change.

The glass substrate and layer have an absorption coefficient of solar light that is about 3%.

EXAMPLE 2

The procedure of example 1 is repeated, but final solution C used for spraying comprises 40% by volume of DBTO. The Al/Sn ratio in the solution C is 0.20:1.

This layer also has a thickness of 90 nm, an Al/Sn ratio of 1.32:1, and an index of refraction after deposition of 1.85±0.02. After heating to 650° C., the index of refraction is 1.72±0.01.

EXAMPLE 3

The procedure of example 1 is repeated, but final solution C used for spraying comprises 50% by volume of DBTO. The Al/Sn ratio of this solution C is 0.13.

This layer has a thickness of 90 nm, an Al/Sn ratio of the layer is 1.23:1, and an index of refraction after deposition of 1.92±0.01. After heating to 650° C., the index of refraction is 1.75±0.01.

EXAMPLE 4

A solution of an aluminum chelate is prepared as in example 1 and pure DBTA is used as the tin compound.

The aluminum chelate solution and DBTA are mixed at a rate of 13% by volume of pure DBTA to 87% by volume of aluminum chelate solution to form a final solution D. The final solution D has a concentration of aluminum and tin compounds, expressed as a weight ratio of the metals (Al/Sn), of 0.67:1.

An $Al_2O_3$—$SnO_2$ layer having a thickness of 90 nm is formed by liquid pyrolysis as indicated in example 1. This layer has a concentration of the aluminum and tin compounds, expressed as a weight ratio weights of the metals (Al/Sn), of 1.33:1.

The $Al_2O_3$—$SnO_2$ has a layer thickness and an index of refraction that are each measured by ellipsometry. The index of refraction is 1.80–1.81. After heating, the layer to 650° C. to simulate heating conditions of subsequent deposition of the semiconductive layer, the index of refraction is 1.66±0.01.

This layer absorbs approximately 6 to 10% of radiation of 550 nm. Heating this layer to 650° C. lowers the absorption percentage to about 2 to 3%. Further, this heating causes a reduction in light absorption by eliminating substantially all the carbon which is incorporated in the layer. A second heating no longer modifies the above optical properties of the layer. Also, the thickness of the layer is stable.

EXAMPLE 5

The procedure of example 4 is repeated, but the final solution to be used for spraying on the glass substrate comprises 20% by volume of pure DBTA. The Al/Sn ratio in this final solution is 0.40:1.

An $Al_2O_3$—$SnO_2$ layer with a thickness of 90 nm is formed by liquid pyrolysis as indicated in example 1. The Al/Sn ratio of the layer is 1.30:1.

The layer has an index of refraction of 1.84±0.02. After heating the glass substrate and layer to 650° C., the index of refraction becomes 1.72±0.01.

The layer absorbs approximately 6 to 10% of radiation of 550 nm. Heating this layer to 650° C. lowers the absorption percentage to about 2 to 3%. Further, this heating causes a reduction in light absorption by eliminating carbon from the layer. A second heating no longer modifies the above optical properties of the layer, which now has a thickness that is stable.

EXAMPLE 6

The procedure of example 4 is repeated, but the final solution to be used in spraying on a glass substrate heated to 600° C. comprises 30% by volume of pure DBTA. The Al/Sn ratio of the final solution is 0.23:1.

An $Al_2O_3$—$SnO_2$ layer with a thickness of 110 nm is formed by liquid pyrolysis as indicated in example 1. The Al/Sn ratio of the layer is 1.27:1.

The layer has an index of refraction that is 1.95±0.02. After heating the glass substrate and layer to 650° C., the index of refraction becomes 1.75±0.01.

This layer absorbs approximately 6 to 10% of radiation of 550 nm. Heating this layer to 650° C. lowers the absorption percentage to about 2 to 3%. Further, this heating causes a reduction in light absorption by eliminating carbon which is incorporated in the layer. A second heating no longer modifies the above optical properties of the layer, which now has a thickness that is stable.

The following examples describe the formation of a semiconductive layer on an $Al_2O_3$—$SnO_2$ layer as formed in examples 2 to 6.

EXAMPLE 7

The $Al_2O_3$—$SnO_2$ layer of example 2 (90 nm thick and having an index of refraction of 1.72±0.01) is heated to 650° C. A layer of $SnO_2$ doped with fluorine ($SnO_2$:F) is formed on the $Al_2O_3$—$SnO_2$ layer by pyrolysis of powdered dibutyltin difluoride (DBTF) to obtain a semiconductive layer having a thickness of 320 nm. This $SnO_2$:F layer exhibits an index of refraction of approximately 2 and has an emissivity of 0.24.

The $Al_2O_3$—$SnO_2$ intermediate layer and the $SnO_2$:F semiconductive layer form a coating structure that does not exhibit iridescence or undulations. This coating structure has a reflection coefficient $R_L$, measured with illuminant $D_{65}$, that is 13%.

The coating structure also has a dominant wavelength (λ dom) in reflection, determined by spectrophotometry as a function of illuminant $D_{65}$, that is 487–508 nm with a purity of 10%.

EXAMPLE 8

An $SnO_2$:F semiconductive layer is formed as in example 7 on the $Al_2O_3$—$SnO_2$ layer of example 3 (90 nm thickness and having an index of refraction 1.75±0.01). This $SnO_2$:F layer has a thickness of 320 nm, an index of refraction of about 2 and an emissivity of 0.24.

The $Al_2O_3$—$SnO_2$ and the $SnO_2$:F layers form a coating structure that does not exhibit iridescence or undulations. The coating structure has a reflection coefficient $R_L$, measured with illuminant $D_{65}$, of 13%. This coating structure has a dominant wavelength in reflection, determined by spectrophotometry as a function of illuminant $D_{65}$, of 483 nm with a purity of 9%.

By way of comparison, a product comprising only a glass substrate and an $SnO_2$:F layer, obtained as above in examples 7 and 8 (thickness of 320 nm, index of refraction of about 2 and emissivity of 0.24), was prepared. Reflection coefficient $R_L$ for illuminant $D_{65}$ is 11%. Dominant wavelength in reflection is 478–481 nm with a purity of 10%.

Thus, the coating structure of example 8 optical neutrality. The dominant wavelength in reflection is blue in color (483 nm) with a purity equal to 9%.

EXAMPLE 9

A glazing comprising a glass substrate, the $Al_2O_3$—$SnO_2$ intermediate layer of example 3 (a thickness of 90 nm and an index of refraction of 1.75±0.01) and the $SnO_2$:F semiconductive layer of example 7 is formed, except that the thickness of the $SnO_2$:F layer is 300 nm.

This $SnO_2$:F layer has an emissivity of 0.25. The glazing has a dominant wavelength in reflection of 483 nm and a purity of 9%. This glazing also has a reflection coefficient $R_L$ of 12%.

EXAMPLE 10

Another glazing is formed in a manner similar to that of example 9, except that the thickness of the $SnO_2$:F semiconductive layer is 360 nm.

The emissivity of this $SnO_2$:F layer is 0.22. The glazing has a dominant wavelength in reflection of 487 nm with a purity of 5%. This glazing has a reflection coefficient $R_L$ of 12%.

Light characteristics of the glazing were also determined as a function of illuminant A. Reflection coefficient $R_L$ is 12%, and the dominant wavelength in reflection is 497 nm with a purity of 3%.

As is apparent, the emissivity of the $SnO_2$:F layer decreases as the thickness of the $SnO_2$:F layer increases. Further, the dominant wavelength in reflection of the glazing is virtually constant. Conversely, the purity (optical neutrality criterion) is improved as the thickness of the $SnO_2$:F layer is increased.

As a result of the above-mentioned properties of the coated structures of examples 7 to 10, these glazings are particularly well suited for use as low-emissivity glazings in buildings.

The $SnO_2$:F layers of the above-mentioned glazings have resistivities that are on the order of $6 \times 10^{-4} \Omega$ cm. These glazings are therefore also particularly useful as heated glazings for motor vehicles.

EXAMPLE 11

A semiconductive layer of $SnO_2$ doped with fluorine is formed on an $Al_2O_3$—$SnO_2$ intermediate layer. The $Al_2O_3$—$SnO_2$ layer is formed as in example 4 from DBTA (90 nm thickness and an index of refraction after heating of 1.66±0.01).

In this example, the $Al_2O_3$—$SnO_2$ layer is heated to 650° C. and the $SnO_2$:F layer is formed by pyrolysis from powdered dibutyltin difluoride (DBTF) to obtain a semiconductive layer having a thickness of 320 nm. This $SnO_2$:F layer has an index of refraction of about 2 and an emissivity of 0.25.

The $SnO_2$:F and $Al_2O_3$—$SnO_2$ layers form a coating structure that has a reflection coefficient $R_L$ for illuminant $D_{65}$ of 12%. This coating structure also has a dominant wavelength in reflection, determined by spectrophotometry as a function of illuminant D65, of 482 nm with a purity of 21%.

EXAMPLE 12

As in example 11, an $SnO_2$:F semiconductive layer with a thickness of 320 nm is formed on an $Al_2O_3$—$SnO_2$ intermediate layer to form a coating structure. This $Al_2O_3$—$SnO_2$ layer is prepared as in example 5 (thickness of 90 nm and an index of refraction of 1.72±0.01).

The coating structure does not exhibit iridescence or undulations, and the $SnO_2$:F layer has an emissivity of 0.25.

This coating structure has a reflection coefficient $R_L$ for illuminant $D_{65}$ of 12%, and a dominant wavelength in reflection of 491 nm with a purity of 10%.

EXAMPLE 13

A coating structure comprising an $Al_2O_3$—$SnO_2$ intermediate layer obtained from DBTA as in example 6 (an index of refraction equal to 1.75±0.01 and a thickness of=110 nm) and an $SnO_2$:F semiconductive layer with a thickness of 320 nm and an emissivity of 0.24 is prepared. This semiconductive layer is prepared as in example 11.

This coating structure does not exhibit iridescence or undulations. Also, the coating structure has light characteristics which are determined as a function of illuminant $D_{65}$. The coating structure has a reflection coefficient $R_L$ of 11.5%, and a dominant wavelength in reflection of 484 nm with a purity of 9%.

The light characteristics of the coating structure are also determined as a function of illuminant A. The reflection coefficient $R_L$ is 11.3%, and the dominant wavelength in reflection is 499 nm with purity of 7.3%.

The coating structure of an $Al_2O_3$—$SnO_2$ intermediate layer obtained from DBTA which has an Al/Sn weight ratio of 1.27:1 exhibits the best optical neutrality. As in the case of the $Al_2O_3$—$SnO_2$ layer obtained from DBTO (50% by volume in the solution), the dominant wavelength in reflection is blue in color (483–484 nm) with a purity equal to 9%.

Thus, when the Al/Sn weight ratio of the $Al_2O_3$—$SnO_2$ intermediate layer is 1.33:1 or 1.30:1 (examples 11 and 12), the purity of the dominant wavelength in reflection is 21% and 13%, respectively. A coating structure formed by the $Al_2O_3$—$SnO_2$ and $SnO_2$:F layers therefore cannot be considered as neutral in reflection. Thus, the coating structure cannot be advantageously used in glazings for buildings or motor vehicles.

The coating structures of examples 11 to 13 have a resistivity on the order of $6 \times 10^{-4} \Omega$ cm. Thus, the coating structures can be advantageously used as heated glazings, particularly for use in motor vehicles.

EXAMPLE 4

A) Formation of an $Al_2O_3$—$TiO_2$ layer

A solution A of 5% by weight of titanium in ethyl acetate is prepared from titanium chelate (titanium acetylacetonate and titanium isopropylate) and titanium alcoholate (titanium tetraoctyleneglycol). This solution A has a concentration of chelate to alcoholate, expressed as a weight ratio, of 2:1.

A solution B of nonhydrolyzable aluminum chelate (aluminum isovalerylacetonate) is formed by mixing with ethyl acetate to a proportion of 2.55 g of aluminum per 100 ml of solution.

Solutions A and B are mixed quickly at a proportion of 33 ml of solution A to 67 ml of solution B. These solutions are totally miscible and form a final solution C, which has a concentration of aluminum and titanium, expressed as a weight ratio of the metals (Al/Ti), of 1.18:1.

The final solution C is used in a similar manner as solution C in example 1 to form an $Al_2O_3$—$TiO_2$ intermediate layer, which has an index of refraction, measured by ellipsometry, of $1.76 \pm 0.01$ and an absorption coefficient of sunlight that is approximately 1%.

B) Deposition of a semiconductive layer

The $Al_2O_3$—$TiO_2$ intermediate layer obtained above is heated to 650° C. and a semiconductive layer of $SnO_2$ doped with fluorine by pyrolysis of powdered dibutyltin difluoride (DBTF) is formed on the intermediate layer. The $SnO_2$:F layer has a thickness of 310 nm$\pm$10 nm, an emissivity of 0.27, and an index of refraction of about 2.

It should be noted that heating the $Al_2O_3$—$TiO_2$ layer to 650° for formation of the semiconductive layer does not modify the index of refraction of the $Al_2O_3$—$TiO_2$ layer.

The coating structure has a dominant wavelength, determined by spectrophotometry as a function of illuminant $D_{65}$, of 483 nm with a purity of 8.2%.

The dominant wavelength has also been determined as a function of illuminant A to be 499 nm with a purity of 6%.

The dominant wavelength of the coating structure of the present example has a purity of less than 10%, whether the chosen illuminant is illuminant $D_{65}$ or illuminant A. Thus, the coating structure has a neutral color in reflection and does not display colored undulations or iridescence.

With either illuminate $D_{65}$ or illuminate A, the light transmission coefficient $T_L$ and light reflection coefficient $R_L$ are, respectively, about 79% and 12%.

Therefore, due to the above-mentioned properties, this coating structure is advantageously usable as a low-emissivity glazing for buildings.

Further, the coating structure has a resistivity of $7 \times 10^{-4} \Omega$ cm. Therefore, this coating structure is also useful as a heated motor vehicle glazing.

EXAMPLE 15

A product with an identical glass substrate and a identical layer of tin oxide doped with fluorine ($SnO_2$:F) obtained in the preceding example is formed for use as a control. The $SnO_2$:F layer is 310 nm$\pm$10 nm thick. This product does not include the $Al_2O_3$—$TiO_2$ intermediate layer. The dominant wavelength, determined as a function of illuminant $D_{65}$, is 489 nm with a purity of 20%. Light characteristics $T_L$, $R_L$, of the product are, respectively, about 77% and 11%.

EXAMPLE 16

The procedure of example 14a is repeated, except that, to obtain the final solution C, 28 ml of solution A and 72 ml of solution B are mixed. Final solution C has a concentration of aluminum and titanium, expressed as a weight ratio of the metals (Al/Ti), of 1.47:1.

The $Al_2O_3$—$TiO_2$ intermediate layer obtained has a thickness of 85 nm with a thickness variation $\Delta e/e$ of 5% and an index of refraction of $1.75 \pm 0.01$. The intermediate layer also has an absorption coefficient of about 1%.

An $SnO_2$:F semiconductive layer is formed on the $Al_2O_3$—$TiO_2$ intermediate layer, as described in example 14b. This semiconductive layer is 310 nm$\pm$10 nm thick. The $SnO_2$:F semiconductive layer has an emissivity of 0.24 and a resistivity of $6 \times 10^{-4} \Omega$ cm.

Light characteristics of the $SnO_2$:F semiconductive layer and the $Al_2O_3$—$TiO_2$ intermediate layer on a glass substrate, which form the glazing, are measured. The dominant wavelength in reflection, determined as a function of illuminant $D_{65}$, is 480 nm with a purity of 9%. The dominate wavelength in reflection, determined as a function of illuminant A, is 496 nm with a purity of 6%.

The glazing further has a light transmission coefficient $T_L$ and a light reflection coefficient $R_L$, for either illuminant $D_{65}$ or illuminant A, of approximately 79% and 12%, respectively.

Thus, the glazing also displays a neutral color in reflection and does not exhibit colored iridescence or undulations.

EXAMPLE 17

A solution is prepared, in ethyl acetate, of titanium acetylacetonate, titanium isopropylate, and titanium tetraoctyleneglycol, and aluminum isovalerylacetonate as in example 14. This solution has a concentration of aluminum and titanium, expressed as a weight ratio of the metals (Al/Ti), of 1.77:1.

As indicated in example 14, an $Al_2O_3$—$TiO_2$ intermediate layer is formed with the solution. The intermediate layer has a thickness of 90 nm, with a thickness variation of 5%. The intermediate layer has an index of refraction of $1.74 \pm 0.01$ and absorbs 1% of light.

A semiconductive layer of tin oxide doped with fluorine ($SnO_2$:F) having a thickness of 310 nm$\pm$10 nm and an emissivity of 0.25 is formed on the intermediate layer by pyrolysis, as in example 14b.

The intermediate and semiconductive layers form a coating structure which has a dominant wavelength in reflection, determined as a function of illuminant $D_{65}$, of 482 nm with a purity of 9%.

EXAMPLE 18

An $Al_2O_3$—$TiO_2$ intermediate layer is obtained by liquid pyrolysis as in example 14. However, this layer is prepared from a solution which has an Al/Ti ratio of 2.06:1. The $Al_2O_3$—$TiO_2$ layer has a thickness of 95 nm and an index of refraction of $1.70 \pm 0.01$.

A semiconductive layer of tin oxide doped with fluorine which has a thickness of $310 \pm 10$ nm is also prepared on the intermediate layer.

The intermediate and semiconductive layers form a coating structure which has a dominant wavelength in reflection, determined as a function of illuminant $D_{65}$, of 384 nm with a purity of 14%.

EXAMPLE 19

An $Al_2O_3$—$TiO_2$ intermediate layer is formed on a glass substrate from a solution which has an Al/Ti ratio of 2.36:1. The $Al_2O_3$—$TiO_2$ layer has a thickness of 90 nm and an index of refraction of $1.69 \pm 0.01$.

An $SnO_2$:F semiconductive layer with a thickness of 310 nm$\pm$10 nm is formed on the $Al_2O_3$—$TiO_2$ intermediate layer.

The intermediate and semiconductive layers form a coating structure which has dominant wavelength in reflection, determined as a function of illuminant $D_{65}$, of 462 nm with a purity of 18%.

It is apparent from examples 18 and 19 that by increasing the Al/Ti ratio of the intermediate layer to values greater than about 2:1, the intermediate layer/- semiconductive layer coating structures obtained are not neutral in reflection and are not usable for forming low-emissivity glazings.

In these examples, the semiconductive layer is formed by tin oxide doped with fluorine. Products exhibiting similar properties can be also obtained by using a semiconductive layer of indium oxide doped with tin (ITO). Such a layer further offers the advantage of having an emissivity of about 0.11 for a thickness of 180 nm.

According to the provisions of the Patent Statutes, I have explained the principle, preferred construction and mode of operation of my invention and have illustrated and described what I now consider to represent its best embodiments. However, it should be understood that within the scope of the appended claims, the invention may be practiced otherwise than as specifically illustrated and described.

We claim:

1. A coated glass structure for use as a glazing, comprising:
    a glass substrate; and
    a layer of aluminum oxide and titanium oxide upon at least a portion of said glass substrate and a semiconductive layer upon at least a portion of said layer of aluminum oxide and titanium oxide;
    wherein said layer of aluminum oxide and titanium oxide has an index of refraction of between about 1.73 and 1.80, an absorption percentage over the visible spectrum of less than or equal to about 3%, and a thickness between about 40 nm and 150 nm with a thickness variation of less than or equal to about 5%, and wherein said layer of aluminum oxide and titanium oxide is formed on said glass substrate by heating said glass substrate to a temperature less than its softening temperature, forming a solution of a non-hydrolyzable aluminum chelate and at least two heat decomposable titanium compounds to form a solution having a weight ratio of Al:Ti of not greater than about 2:1, and spraying said solution onto said heated glass substrate to thermally decompose and oxidize said solution on said heated glass substrate to form a layer of aluminum oxide and titanium oxide on said glass substrate.

2. The structure of claim 1 which further comprises:
    a plastic sheet of PVB, PVC, or PU polymer; and
    a glass plate having an upper edge and a lower edge, wherein power lead-ins are placed along said upper edge and said lower edge; and
    wherein said plastic sheet is inserted in contact with and in between said semiconductive layer and said glass plate to form a heated, laminated glazing.

3. The structure of claim 1 which further comprises a semiconductive layer on said layer of aluminum oxide and titanium oxide.

4. The structure of claim 1, wherein said semiconductive layer is a layer of tin oxide doped with fluorine, a layer of indium oxide doped with tin or a layer of zinc oxide doped with indium or aluminum.

5. The structure of claim 4, wherein said layer of aluminum oxide and titanium oxide has a thickness between about 80 nm and 100 nm and said semiconductive layer has a thickness between about 100 nm and 800 nm; wherein said layer of aluminum oxide and titanium oxide and said semiconductive layer form a coating structure which is neutral in reflection with a purity in reflection less than or equal to about 10%.

6. The structure of claim 4, wherein said layer of aluminum oxide and titanium oxide has an absorption percentage of less than or equal to about 3%, an index of refraction of about 1.75±0.01 and a thickness of about 90 nm with a thickness variation less than or equal to about 5%; said semiconductive layer has a thickness of 360 nm; and said layer of aluminum oxide and titanium oxide and said semiconductive layer form a coating structure which is neutral in reflection with a purity in reflection of approximately 5%.

7. The structure of claim 3, wherein said layer of aluminum oxide and titanium oxide has an absorption percentage of less than or equal to about 3% and a thickness between about 80 nm and 100 nm with a thickness variation less than or equal to about 5%; said semiconductive layer is formed of tin oxide doped with fluorine and has a emissivity less than or equal to about 0.27 and a thickness greater than or equal to about 300 nm; and said aluminum oxide and tin oxide layer, said semiconductive layer and said glass substrate form a low-emissivity glazing, wherein said low-emissivity glazing is neutral in reflection with a purity in reflection less than or equal to about 10%.

8. The structure of claim 5, wherein said layer of aluminum oxide and titanium oxide has an absorption percentage of less than or equal to about 3% and a thickness variation less than or equal to about 5%; said semiconductive layer has a resistivity of approximately $6 \times 10^{-4}$ Ω cm; and said aluminum oxide and titanium oxide layer, said semiconductive layer and said glass substrate form a heated glazing which is neutral in reflection with a purity in reflection less than or equal to about 10%.

9. The structure of claim 6, which further comprises:
    a plastic sheet of PVB, PVC, or PV polymer; and
    a glass plate having an upper edge and a lower edge, wherein power lead-ins are placed along said upper edge and said lower edge;
    wherein said plastic sheet is inserted in contact with and in between said semiconductive layer and said glass plate to form a heated, laminated glazing.

10. A coated glass structure for use as a glazing, comprising:
    a glass substrate; and
    a layer of aluminum oxide and titanium oxide upon at least a portion of said glass substrate;
    wherein said layer of aluminum oxide and titanium oxide has an index of refraction between about 1.73 to 1.80, an absorption percentage over the visible spectrum of less than or equal to about 3%, and a thickness between about 40 nm to 150 nm with a thickness variation less than or equal to about 5%.

11. A coated glass structure for use as a glazing, comprising:
    a glass substrate and a stack of layers on the glass substrate, said stack comprising,
    a layer of aluminum oxide and tin oxide upon at least a portion of said glass substrate, said layer having an Al to Sn ratio between 1.15 to 1.40; a titanium oxide layer formed on said layer of aluminum oxide and tin oxide, and a semiconductive layer upon at least a portion of said layer of aluminum oxide and tin oxide to form a glazing which is neutral in reflection with a purity in reflection less than or equal to about 10%,
    wherein said layer of aluminum oxide and tin oxide has an index of refraction between about 1.65 to 1.76, an absorption percentage over the visible spectrum of less than or equal to about 3%, and a thickness between about 40 nm to 150 nm with a thickness variation less than or equal to about 5%, and wherein said layer of aluminum oxide and tin oxide is formed by heating said glass substrate to a temperature less than its softening temperature, forming a solution of a non-hydrolyzable aluminum chelate and tin compounds to form a solution having a weight ratio of Al:Sn of about 0.10:1 to 0.70:1, spraying said solution onto said heated glass substrate to thermally decompose and oxidize said solution on said heated glass substrate to form said layer of aluminum oxide and tin oxide on said glass substrate.

12. The coated glass structure of claim 11 further comprising a silicon oxide layer on said titanium oxide layer.

13. The coated glass structure of claim 12 wherein said titanium oxide layer has an optical thickness of about $\lambda/2$.

14. The coated glass structure of claim 13 wherein said silicon oxide layer has an optical thickness of about $\lambda/4$.

* * * * *